L. Paige,
Nut Lock.

Nº 10,368.     Patented Jan. 3, 1854.

UNITED STATES PATENT OFFICE.

LUCIUS PAIGE, OF CAVENDISH, VERMONT.

SCREW-BOLT AND NUT.

Specification of Letters Patent No. 10,368, dated January 3, 1854.

*To all whom it may concern:*

Be it known that I, LUCIUS PAIGE, of Cavendish, in the county of Windsor and State of Vermont, have invented a new and useful Improvement in Screws and Nuts or Articles of Like Character; and I do hereby declare that the same is fully described and represented in the following specification and the accompanying drawings, letters, figures, and references thereof.

Figure 1:
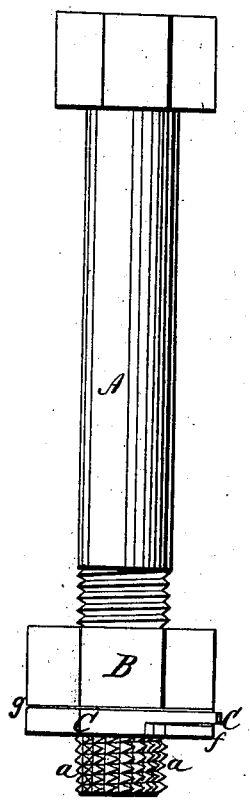
Figure 4:
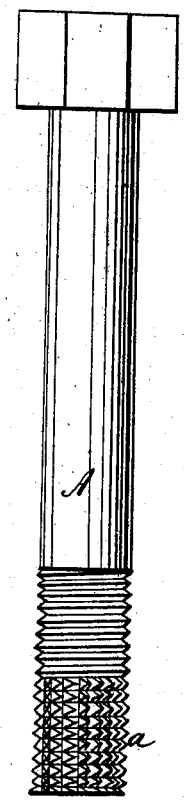
Figure 2:
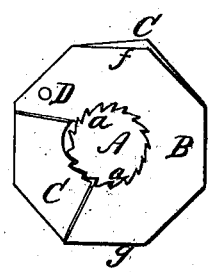
Figure 3:
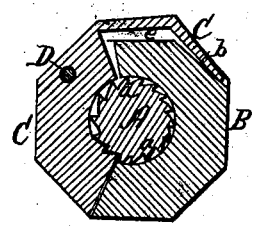

Of the said drawings, Figure 1, represents a side elevation of a screw and nut having my improvement applied to them. Fig. 2, is an end view of the same. Fig. 3, is a transverse section of the screw-nut taken through its pawl and the spring thereof. Fig. 4 is a side view of the male screw as it appears when the nut is removed from it.

The object of my invention is to prevent a screw-nut from turning backward on its screw or from being unscrewed therefrom under ordinary circumstances, or when a wrench or some equivalent is not applied to the nut for the purpose of unscrewing it.

In carrying out my invention, I score or groove the helical thread of the male screw, so as to form it into a row or line of teeth essentially as represented at *a, a*, in Figs. 1, and 3, in which A, denotes the male screw. I next provide the screw nut B (adapted to the screw A) with a dog or catch C, properly made to engage with the teeth formed on the helical thread of the male screw. This dog or catch, I affix in a recess formed in the bolt, and make it as a lever to turn on a fulcrum or pin D. The longer arm of the lever, I make as a spring to bear against a side *b*, of the recess *e*, made in the bolt and I make the tail part of the lever or such longer arm to extend beyond one of the prismatic sides, *f*, of the bolt so that when a wrench is applied to such side and the opposite prismatic side, *g*, it shall force inward the arm of the lever so as to throw the dog or catch out of engagement with the teeth of the screw thread, and thereby permit the nut to be unscrewed from the screw.

That form of the lever or pawl and spring which I prefer is represented in the drawings although I do not confine myself strictly to such as the spring may be applied between the lever and the side of the recess in any other proper manner. The spring serves to keep the dog or catch in engagement with the screw thread teeth and while it is so in engagement it will readily be seen that it will be impossible to move the nut from the screw or screw bolt. For certain parts of locomotive engines and various machines wherein screws and nuts are used, and the latter are liable to become unscrewed by constant or occasional jar or otherwise my improvement will be found of great advantage.

I do not claim the invention of a ratchet wheel and holding pawl and catch as commonly made and applied to prevent back rotation of a wheel revolving on a shaft; but What I do claim is—

1. The forming of the helical thread of a male screw with notches or teeth as specified in combination with applying to its screw nut a dog catch or spring pawl to operate in the said teeth or notches and prevent back rotation of the nut on the screw substantially as above set forth.

2. I also claim the improvement of so applying the catch lever or dog or catch to the nut, that it may project beyond one prismatic side of the nut so that when a wrench is applied to such side of the nut and its opposite side it may press inward the dog or catch or lever thereof, or so act upon the same as to throw such dog or catch out of engagement with the teeth or notches of the male screw so as to allow the nut to be unscrewed from the same substantially as specified.

In testimony whereof, I have hereunto set my signature this seventh day of December A. D. 1853.

LUCIUS PAIGE.

Witnesses:
CHARLES L. BLOOD,
OTIS ROBBINS.